United States Patent
Dev et al.

(10) Patent No.: US 12,002,052 B2
(45) Date of Patent: Jun. 4, 2024

(54) FEATURE SUBSPACE ISOLATION AND DISENTANGLEMENT IN MERCHANT EMBEDDINGS

(71) Applicant: Visa International Service Association, San Francisco, CA (US)

(72) Inventors: Sunipa Dev, Salt Lake City, UT (US); Yan Zheng, Sunnyvale, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 783 days.

(21) Appl. No.: 16/596,665

(22) Filed: Oct. 8, 2019

(65) Prior Publication Data

US 2021/0103925 A1    Apr. 8, 2021

(51) Int. Cl.
| | | |
|---|---|---|
| *G06F 17/16* | (2006.01) | |
| *G06Q 20/40* | (2012.01) | |
| *G06Q 50/12* | (2012.01) | |

(52) U.S. Cl.
CPC ......... *G06Q 20/4015* (2020.05); *G06F 17/16* (2013.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 11,210,721 B1* | 12/2021 | Feng | ................... | G06Q 30/0631 |
| 11,741,528 B1* | 8/2023 | Gjertson | ............ | G06Q 30/0631 705/26.7 |
| 2015/0220835 A1* | 8/2015 | Wilson | ............... | G06Q 30/0269 706/46 |
| 2017/0243112 A1* | 8/2017 | Ekambaram | ........... | G06N 3/045 |
| 2018/0329982 A1* | 11/2018 | Patel | .................... | G06F 16/3322 |
| 2020/0134627 A1* | 4/2020 | Hamooni | ........... | G06Q 20/0855 |
| 2020/0279191 A1* | 9/2020 | Koch | ................. | G06Q 30/0255 |
| 2020/0380021 A1* | 12/2020 | Barbour | .............. | G06F 16/3347 |
| 2021/0065260 A1* | 3/2021 | Zheng | ................ | G06Q 30/0282 |
| 2021/0075690 A1* | 3/2021 | Janakiraman | ......... | G06F 40/205 |

OTHER PUBLICATIONS

Dev, et al., "Attenuating Bias in Word Vectors" dated Jan. 23, 2019; 9 pages.

* cited by examiner

*Primary Examiner* — Chrystina E Zelaskiewicz
(74) *Attorney, Agent, or Firm* — Schwabe, Williamson & Wyatt, PC (57) ABSTRACT

A computer-implemented method for providing merchant recommendations comprises receiving, by a processor, raw merchant embeddings generated from payment transaction records, wherein the raw merchant embeddings include a plurality of embedded features entangled in an embedding space. The processor uses transaction metadata associated with the payment transaction records to determine a subspace of an identified feature within the embedding space. A linear transformation process then removes the subspace of the identified feature from the embedding space to create modified merchant embeddings that are merged and aligned with other ones of the plurality of features within the embedding space. The processor automatically generates a list of merchant rankings based on the modified merchant embeddings, past preferences of a target user using raw user embeddings, and a target region, and provides the list of merchant rankings to the target user.

15 Claims, 8 Drawing Sheets

FEATURE SUBSPACE ISOLATION AND DISENTANGLEMENT IN MERCHANT EMBEDDINGS

BACKGROUND

Personalized restaurant recommendation systems aim to suggest restaurants to end users based on their own preferences, which automatically could provide each target user a personalized ranked list of recommended restaurants based on information learned from a user's behavior history. Most traditional recommendation systems use collaborative filtering, which recommend a user with unexplored items that are liked by other users having similar tastes. Examples of commercial use of collaborative filtering include Amazon® rating scores, Yelp® reviews, and Netflix® movie ratings. To achieve adequate results, collaborative filtering needs sufficient rating scores to find similar users. However, explicit ratings or reviews are often not available, and could be highly biased. Implicit ratings have been proposed for the aforementioned problem. An example of implicit ratings is YouTube's recommendation system that treats a video as being liked by a user if the user finishes that video. Similarly, if a webpage is being scrolled to the end, then it is likely that webpage is being liked.

However, point-of-interest (POI) recommendation systems are more complicated, especially for restaurant recommendations, partly due to the complexity introduced by geographical location factors. For restaurant recommendations, some systems model geographical preferences of users using user check-in data on location-based social networks, but they treat locations that users have been to as what users are likely to prefer. For more accurate recommendations, implicit check-in data may be integrated with explicit review data, while analyzing user preferences based on their demographics information and restaurants attributes. Still, results may be lacking.

Deep learning has been gradually replacing many traditional algorithms in various tasks including recommendation systems. Despite of the successful results, these methods still need either explicit ratings or implicit ones to begin with, however.

Accordingly, what is needed is a merchant recommendation system that suggests merchants to end users based on user preferences without requiring any user reviews or rating data.

BRIEF SUMMARY

Disclosed embodiments provide methods and systems for feature subspace isolation and disentanglement in merchant embeddings. Aspect of the disclosed embodiments include receiving, by a processor, raw merchant embeddings generated from payment transaction records, wherein the raw merchant embeddings include a plurality of embedded features entangled in an embedding space. The processor uses transaction metadata associated with the payment transaction records to determine a subspace of an identified feature within the embedding space. A linear transformation process then removes the subspace of the identified feature from the embedding space to create modified merchant embeddings that are merged and aligned with other ones of the plurality of features within the embedding space. The processor automatically generates a list of merchant rankings based on the modified merchant embeddings, past preferences of a target user using raw user embeddings, and a target region, and provides the list of merchant rankings to the target user.

According to the feature subspace isolation and disentanglement process performed on merchant embeddings disclosed herein, the effect of an identified feature, such as location, implicitly embedded in raw merchant embeddings is effectively removed. With location removed from the merchant embedding, the merchant embeddings representing different merchants from different regions are merged or aligned based on the other features of the embeddings, such as cuisine, popularity (frequency) and/or price, for example. This, in turn, enables a merchant recommendation system to effectively recommend similar merchants/restaurants to cardholders with increased speed and accuracy.

DETAILED DESCRIPTION

The disclosed embodiments relate to feature subspace isolation and disentanglement in merchant embeddings to enable merchant recommendations. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Card payment processors are continuingly seeking to provide cardholders with new services. Once such service might be a merchant recommendation system using extensive user and merchant data available to the card payment processor. To do so, it is important to determine a user's preference for merchants or restaurants irrespective of their current location, so that given a change in user location, the system can still effectively recommend merchants that the user would actually like to visit.

Using extensive payment transaction data over time, the cardholder can observe patterns about merchants and users. A natural language processing technique called word embedding has been applied to payment transaction data to generate raw merchant embeddings in order to learn distributed representations of merchants. As word embedding encodes syntactic and semantic information, the raw merchant embeddings are represented as vectors that include a plurality of encoded features about merchants such as location, price, popularity (i.e., frequency of visits), and cuisine type, for instance.

The merchant embeddings, however, are dominated by different meta information associated with them, such as location of the merchant or their popularity (expressed as their frequency in the transaction data) or the average price spent for the transactions. The factors of frequency and location dominate over other features such as cuisine type. So the similarity between two restaurants is dominated by location and frequency more than the cuisine. This makes building a merchant recommendation system difficult and inaccurate, where the recommendation system may suggest restaurants with similar location and popularity, rather than the cuisine preference of the user. This makes it essential to tease out the different subspaces within the embedding space that represent different features such as location, popularity/frequency or price.

According to the disclosed embodiments, a feature subspace isolation and disentanglement process is performed on the merchant embeddings to remove an identified feature such as location, to merge different merchants from different locations based on other features like volume or cuisine. In one embodiment, the feature subspace isolation and disentanglement process is performed as a post processing technique, as the merchant embeddings are built on extremely large payment card transaction data and retaining the merchant embeddings can be an arduous and time consuming task. Further, only a linear transformation process is used to remove the identified feature from the embedding space, which is more interpretable in terms of what is changed in merchant embeddings to achieve the removal of location, for example, from any vector in the merchant embeddings. As only linear transformations are applied, the other embedded features between any two points in the embedding space are also retained.

Figure 1:
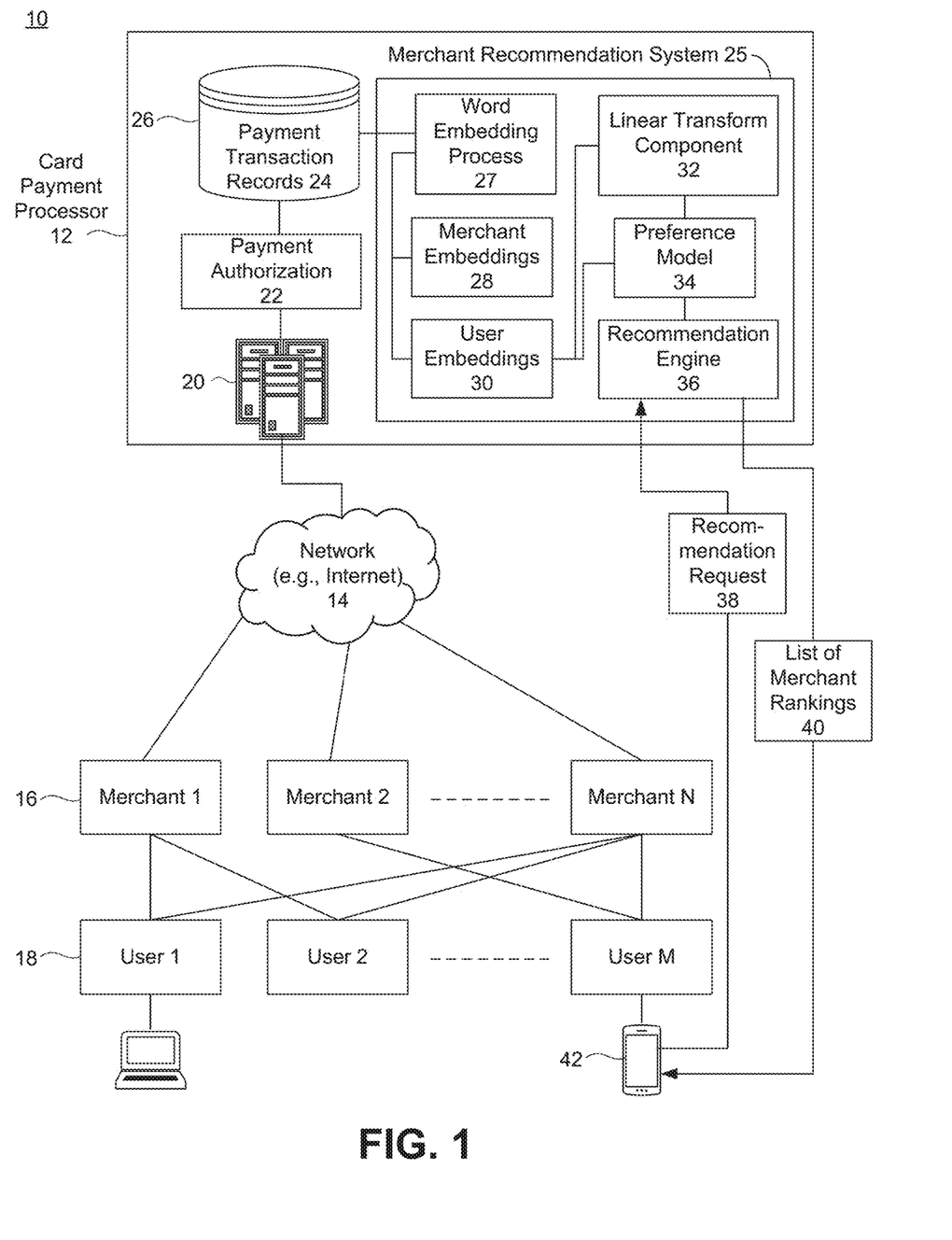
FIG. 1 is a diagram of one embodiment of a card payment processing system in which the disclosed embodiments may be implemented.

FIG. 1 is a diagram of one embodiment of a card payment processing system in which the disclosed embodiments may be implemented. The card payment processing system 10 includes a card payment processor 12 in communication (direct or indirect) over a network 14 with a plurality of merchants 16. A plurality of cardholders or users 18 purchase goods and/or services from various ones of the merchants 16 using a payment card such as a credit card, debit card, prepaid card and the like. Typically, the card payment processor 12 provides the merchants 16 with a service or device that allows the merchants to accept payment cards as well as to send payment details to the card payment processor 12 over the network 14. In some embodiments, an acquiring bank or processor (not shown) may forward the credit card details to the card payment processor 12. Payment card transactions may be performed using a variety of platforms such as brick and mortar stores, ecommerce stores, wireless terminals, and user mobile devices. The payment card transaction details sent over the network 14 are received by one or more servers 20 of the payment card processor 12 and processed by, for example, by a payment authorization process 22 and/or forwarded to an issuing bank (not shown). The payment card transaction details are stored as payment transaction records 24 in a transaction database 26.

The most basic and common type of payment transaction data is referred to as a level 1 transaction. The basic data fields of a level 1 payment card transaction are: i) merchant name, ii) billing zip code, and iii) transaction amount. Additional information, such as the date and time of the transaction and additional cardholder information may be automatically recorded, but is not explicitly reported by the merchant 16 processing the transaction. A level 2 transaction includes the same three data fields as the level 1 transaction, and in addition, the following data fields may be generated automatically by advanced point of payment systems for level 2 transactions: sales tax amount, customer reference number/code, merchant zip/postal code tax id, merchant minority code, merchant state code.

In one embodiment, the payment card processor 12 further includes a merchant recommendation system 25 that provides personalized merchant recommendations to users 18 based on each user's own payment transaction records 24 and past preferences of the user and other users 18. The recommendation engine 36 is capable of recommending any type of merchant, such as hotels, but for purposes of example, the recommendation engine 36 is described as providing recommendations to restaurant merchants, or simply restaurants.

The merchant recommendation system 25 mines the payment transaction records 24 to: i) to represent each merchant 16 and each user 18 as merchant embeddings 28 and user embeddings 30, respectively, using an embedding scheme performed by a word embedding process 27; and ii) to learn the user preferences for merchants 16. The user preferences are determined by a preference model 34, e.g., a deep neural network (DNN) classifier, and are based only on the payment transaction records 24 without any rating or review data or detailed metadata about the merchants/restaurants.

According to one aspect of the disclosed embodiments, the merchant recommendation system 25 further includes a linear transform component 32 to perform a linear transformation on the merchant embeddings 28 to disentangle or remove the influence of an identified feature, such a location, to create modified merchant embeddings. In one embodiment, the linear transform component 32 may be implemented in software. In another embodiment, the linear transform component 32 may be implemented in in hardware, or a combination of hardware and software.

Based on the modified merchant embeddings and the raw user embeddings 30, the preference model 34 may determine/learn a target user's preferences for merchants. The learned user preferences are used by a recommendation engine 36 to provide personalized merchant recommendations, such as restaurant recommendations, for example. The recommendation engine 36 can respond to a merchant recommendation request 38 from a user 18 and provide a list of merchant rankings 40 in response. In another embodiment, the recommendation engine 36 may push the list of merchant rankings 40 to one or more target users 18 based on current user location, a recent payment transaction, or other metric. In one embodiment, the user 18 may submit the recommendation request 38 through a payment card application (not shown) running on a user device 42, such as a smartphone or tablet. In another embodiment, users 18 may interact with the merchant recommendation system 25 through a conventional web browser.

In one embodiment where the merchant recommendations are for restaurants specifically, the merchant recommendation system 25 may respond to a recommendation request 38 by finding all restaurants within a particular region. The region may be defined to be within a threshold distance of the user's current location or the location may be specified by the user 18. Each pair of restaurants in the region is compared for the user 18 by the preference model 34 to determine which restaurant is preferred by the user 18 based on past user preferences. The recommendation engine 36 then computes a ranked list of all restaurants in the regions based on the pairwise comparison results.

In one embodiment, the word embedding process 27, the linear transform component 32, the preference model 34, and the recommendation engine 36 are implemented as software components. In another embodiment, the components could be implemented as a combination of hardware and software. Although the wording embedding process 27, the linear transform component 32, the preference model 34, and the recommendation engine 36 are shown as separate components, the functionality of each may be combined into a lesser or greater number of modules/components. In addition, although a server 20 is shown hosting the wording embedding process 27, the linear transform component 32, the preference model 34, and the recommendation engine 36, these components may be run on any type of one more computers that have memory and processor.

Both the server 20 and the user devices 42 may include hardware components of typical computing devices (not shown), including a processor, input devices (e.g., keyboard, pointing device, microphone for voice commands, buttons, touchscreen, etc.), and output devices (e.g., a display device, speakers, and the like). The server 20 and user devices 42 may include computer-readable media, e.g., memory and storage devices (e.g., flash memory, hard drive, optical disk drive, magnetic disk drive, and the like) containing computer instructions that implement the functionality disclosed herein when executed by the processor. The server 20 and the user devices 42 may further include wired or wireless network communication interfaces for communication.

Although the server 20 is shown as a single computer, it should be understood that the functions of server 20 may be distributed over more than one server, and the functionality of software components may be implemented using a different number of software components. For example, the linear transform component 32 may be implemented as more than one component. In an alternative embodiment (not shown), the server 20 and the linear transform component 32, preference model 34 and recommendation engine 36 of FIG. 1 may be implemented as a virtual entity whose functions are distributed over multiple user devices 42.

Figure 2:
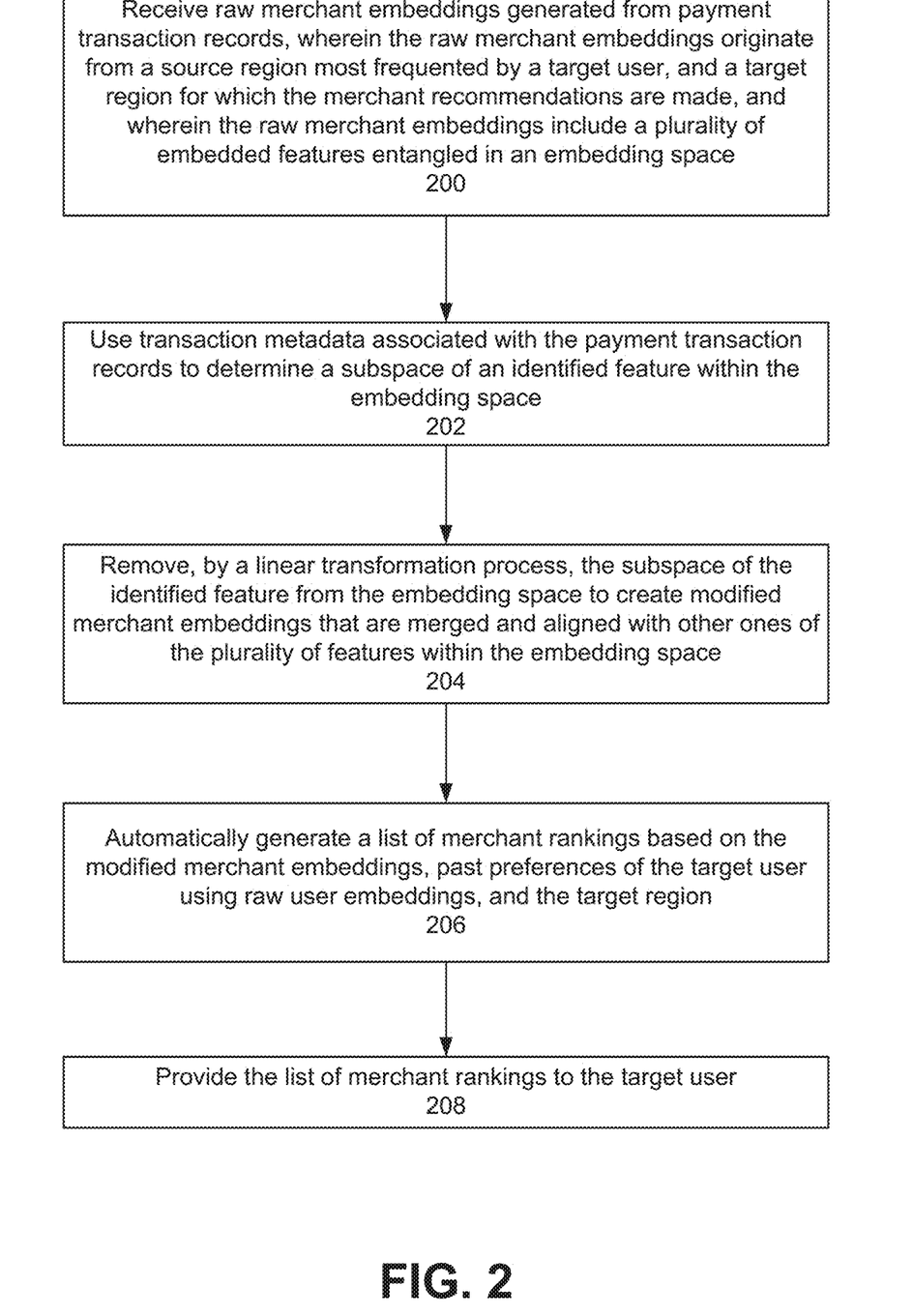
FIG. 2 illustrates a flow diagram of a process for providing merchant recommendations based on payment transaction records using subspace isolation and disentanglement to according to one embodiment.

FIG. 2 illustrates a flow diagram of a process for providing merchant recommendations based on payment transaction records using subspace isolation and disentanglement to according to one embodiment. The process may be performed by one or more processors when configured by the components of the merchant recommendation system 25 stored in computer-readable memory of the servers 20 or other computers.

The process may begin by receiving raw merchant embeddings 28 and raw user embeddings 30 generated from the payment transaction records 24 in the transaction database 26, wherein the raw merchant embeddings 28 originate from a source region most frequented by a target user, and a target region for which the merchant recommendations are made for the target user, and wherein the raw merchant embeddings include a plurality of embedded features entangled in an embedding space (block 200).

The merchant recommendation system 25 learns user merchant preferences from the payment transaction records 24 to generate personalized restaurant recommendations. For example, the merchant recommendation system 25 may have access to millions of payment transactions available in the transaction database 26, among which there may be over 200 million active cardholders (users 18) and more the 75 million active merchants 16 (e.g., restaurants, retailers, online shopping website, and supermarkets). In embodiments, all user identity related information may be processed as hash values, from which user identities cannot be verified.

The subspace isolation and disentanglement may be performed as a post processing operation and is used to increase the speed and accuracy of the merchant recommendations made to the target user. The target user is associated with a source region where the target user visits merchants most frequently, and the merchant recommendation system 25 is recommending merchants to the target user that are located in the target region. The target user may or may not be currently located in the target region. For example, the target user may request a recommendation from the merchant recommendation system 25 for restaurants in a target region the target user is about to visit. Similarly, the merchant recommendation system 25 may automatically determine that the target user is about to travel to the target region by analyzing the payment transaction records 24 and pushes the recommendation to the target user.

The raw merchant embeddings 28 and the raw user embeddings 30 may generated from the payments transaction records 24 by the word embedding process 27, which in one embodiment may be implemented as a Word2vec model or GloVe, for example. Typically, word embedding is a natural language modelling technique used to map words or phrases from a vocabulary to a corresponding vector of real numbers. As well as being amenable to processing by learning algorithms, this vector representation has two important and advantageous properties: it is a more efficient representation (dimensional reduction) and it is a more expressive representation (contextual similarity). Ideally, an embedding captures some of the semantics of the input by placing semantically similar inputs close together in the embedding space. Here, word embedding is used to map the payment transaction data records 24 to an embedding space, rather than words of a language, where each point in the embedding space may correspond to a unique merchant ID.

Although the word embedding process 27 is shown as being executed by the card payment processor 12, in another embodiment, the word embedding process 27 may be executed by a third party that forwards the raw merchant embeddings 28 and the raw user embeddings 30 to the card payment processor 12.

Figure 3:
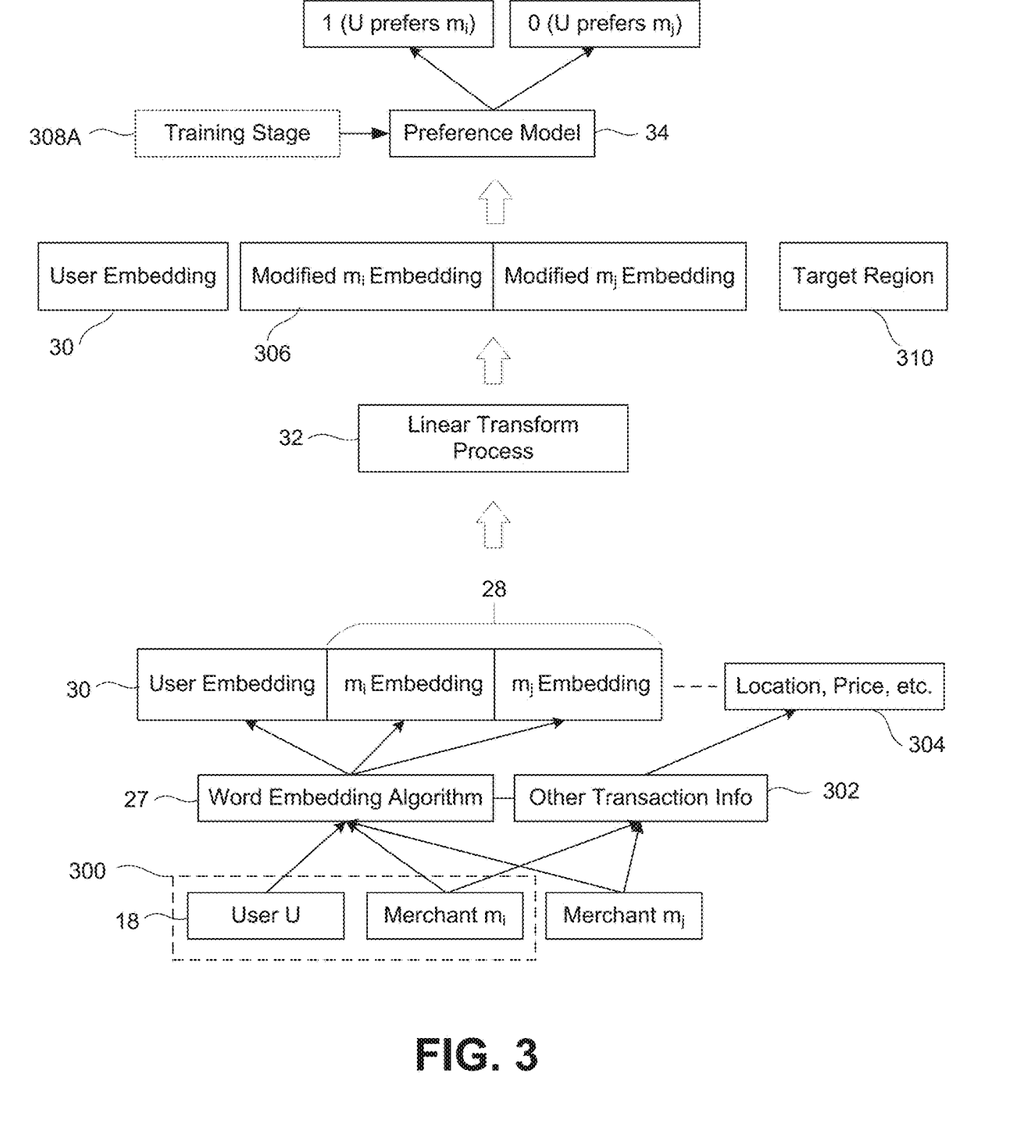
FIG. 3 is a diagram illustrating processing of the raw merchant embeddings and the raw user embeddings performed by the merchant recommendation system.

FIG. 3 is a diagram illustrating processing of the raw merchant embeddings 28 and the raw user embeddings 30 performed by the merchant recommendation system 25. The raw user embeddings 30 are created by first compiling all user-merchant pairs 300 in the payment transaction records 24. That is, for each payment transaction record 24, a pair of user IDs (i.e., cardholder account) and merchant IDs is exacted to indicate which user has made a payment to which merchants. The user-merchant pairs 300 are then grouped by distinct merchant IDs. Thus, each merchant group contains a sequence of users who have made payments to this merchant. The grouped user-merchant pairs 300 are then input to the word embedding process 27 where each user in a merchant group is treated as a word and each merchant group is treated as a document, and the word embedding process 27 generates a raw user embedding 30 for each user.

Similarly, to generate the merchant embeddings 28, all user-merchant pairs 300 are grouped by distinct user IDs. A list of all merchants that have been attended by a user is treated as a word and all such words are treated as a document. The word embedding process 27 is then used to generate a raw merchant embedding 28 for each merchant ID. The number of dimensions for each vector are chosen to be both efficient and effective for the task at hand. In one embodiment for example, each raw user embedding 30 may be represented as a 200 dimension float vector, while each raw merchant embedding 28 may be represented by approximately 400 dimensions.

Compared with word embedding used in natural language processing, raw merchant embeddings 28 have many latent encoded features 304 related to the merchants 16 generated from other transaction metadata 302. Example of the features 304 encoded in the merchant embeddings 28 may include location of the merchants, transaction price, average merchant popularity, category of the merchants, and the like. These embedded features influence what merchants a given user visits. First, the physical location of the merchant has to be close to that of the user. For a merchant to be visited frequently by a user typically means that the physical location of the merchant has to be close to that of the user, i.e., the merchant and the user need to be in the same city (i.e., a source region most frequented by a target user) for the user to frequent the merchant. Distance to different merchants also impacts preference of users. Next, the price or average amount of money spent at a merchant is factored into the user's choices of places to visit. The average popularity of a merchant is also reflected in the dataset as a whole by the frequency of a merchant ID in the cumulative 'text'. All of this is captured and expressed by the raw merchant embeddings 28.

Features such as location, number of transactions and cost may be obtained directly from the payment transaction records 24 or other statistics. For cuisine style, which is not available from the payment transaction records 24, the merchant recommendation system 25 may use the name of chain restaurants as a label for cuisine type according in one embodiment.

When training the preference model 34 to predict user merchant/restaurant preferences, for example, it is assumed that if two restaurant $r_i$ and $r_j$ are very close, and if $r_i$ is visited many more times than $r_j$, then a conclusion can be drawn that $r_i$ is preferred over $r_j$. The reason to recommend a close restaurant is due to the characteristics of the merchant embeddings 28 produced by the word embedding process 27. Raw merchant embedding 28 implicitly contain location information because in one location, similar merchants 16 have high chance of being visited by the same group of people from that location than other locations. Thus, raw merchant embedding 28 from the same place will be grouped together in the embedding space.

The factors of frequency and location dominate over other features such as cuisine type. So the similarity between two restaurants is dominated by location and frequency more than the cuisine. This makes building a merchant recommendation system difficult and inaccurate, where the recommendation system may suggest restaurants with similar location and popularity, rather than the cuisine preference of the user. This makes it essential to tease out the different subspaces within the embedding space that represent different features such as location, popularity/frequency or price.

Figure 4A:
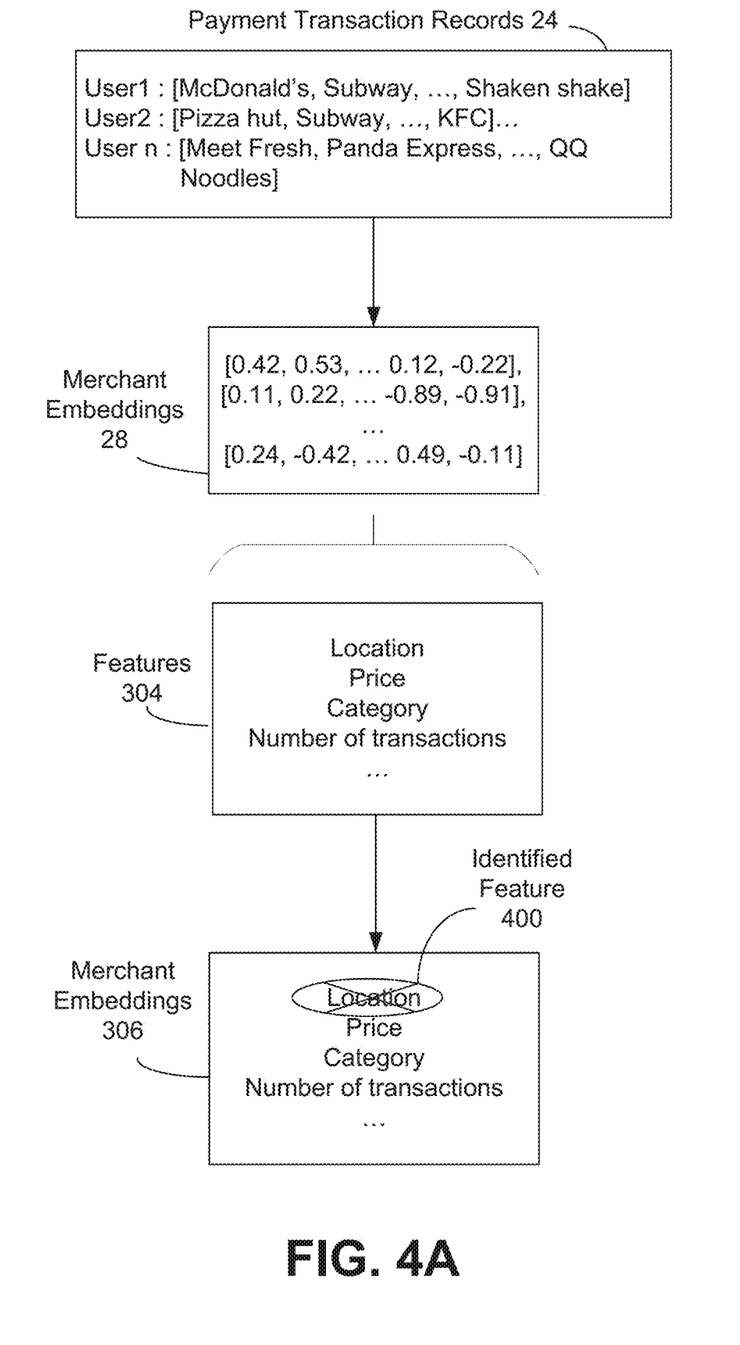
FIG. 4A is a diagram illustrating examples of payment transaction records, merchant embeddings and features thereof.

FIG. 4A is a diagram illustrating examples of payment transaction records 24, merchant embeddings 28 and features thereof. Several payment transaction records 24 are shown for User 1 through User n showing the names of merchants each user has transacted with. The word embedding process 27 (FIG. 1) generates the merchant embeddings 28 from the payment transaction records 24, where each merchant embedding is represented as a multidimensional vector of numbers in an embedding space that forms a point in that space.

The features 304 encoded in the merchant embeddings 28 may include location, price, category, and number of transactions (i.e., merchant popularity/frequency), and the like. Due to the natural characteristic of the transaction data, merchants in the same location tend to be close to each other. For example, a McDonald's in San Francisco is closer to a Hilton Hotel in San Francisco than a McDonald's in Chicago. In this case, location is implicitly embedded into the embedding space and is a dominating factor. This makes translation of user preferences from one location to another inaccurate, with the system suggesting restaurants primarily having similar locations, rather than by the cuisine preference of the user.

However, since features 304 are implicitly embedded in the merchant embeddings 28 and entangled together, it can be challenging to determine a process to identify those individual features in the raw merchant embedding 28 and disentangle those features. One challenge is that there are multiple regions, e.g., cities or neighborhoods, and the location direction for all regions are different for each pair of regions. Therefore, the challenge is to map the features together to common spaces. As an example, consider merchant embeddings from two different regions (cities), as shown in FIG. 4B.

Figure 4B:
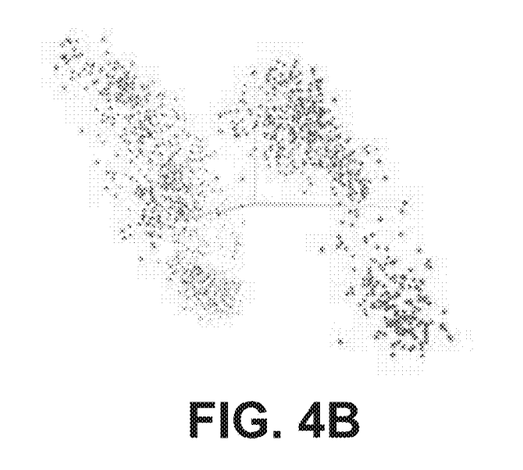
FIG. 4B is a diagram illustrating a principal component analysis (PCA) view of 200-dimension merchant embeddings for restaurants in San Francisco (left cluster) and New York (right cluster).

FIG. 4B is a diagram illustrating a principal component analysis (PCA) view of 200-dimension merchant embeddings for restaurants in San Francisco (left cluster) and New York (right cluster). The merchant embeddings from two locations are labeled using different colors (light and dark) from the PCA view of the embedding and are well separated by a linear hyperplane.

Figure 4C:
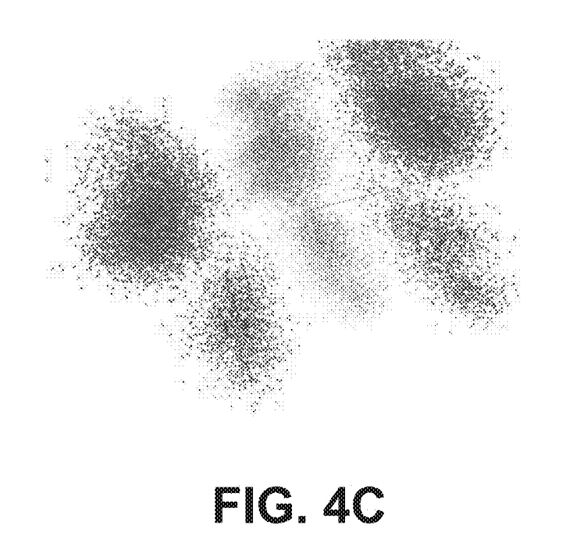
FIG. 4C is a diagram illustrating a PCA view of merchant embeddings of restaurants from California (top three clusters) and Texas (bottom three clusters).

FIG. 4C is a diagram illustrating a PCA view of merchant embeddings of restaurants from CA California (top three clusters) and Texas (bottom three clusters). In this example, the merchant embeddings from California and Texas each show three sub-clusters representing location, price and popularity/frequency, where price and popularity/frequency are derived using the transaction metadata 302.

From a recommendation point of view, these merchant embeddings from the different regions shown in FIG. 4B should be aligned with each other, and the different regions shown in FIG. 4C should be aligned with each other, since the embeddings represent the same restaurants from different regions. To make them similar, the effect of location needs to be removed from the merchant embeddings, while keeping the effects of the other information such as price, popularity/frequency and cuisine or category information.

The problem is there is no single dimension corresponding to any one of the features, thus identifying the meaning of each embedding is an impossible task. Instead, the disclosed embodiments provide an algorithm to minimize the difference between the identified feature(s) such that no classifier can classify the embeddings based on such features.

To solve the problem of entangled merchant embeddings, the disclosed embodiments provide a feature subspace isolation and disentanglement process for merchant embeddings. According to one aspect of the disclosed embodiments, in order for the recommendation engine 36 to recommend a merchant/restaurant in any region for the target user, the merchant recommendation system 25 differentiates different subspaces within the embedding space that represent different features 304 such as location, price, or category. Based on the type of recommendation being given, one of the features is identified for removal from the embeddings. Referring again to FIG. 4A, the feature subspace isolation process disentangles or otherwise removes an identified feature 400, such as location information, implicitly embedded in the merchant embeddings 28 when generating the modified merchant embeddings 306.

Referring again to FIGS. 2 and 3, according to one embodiment the disentanglement process includes using transaction metadata 302 associated with the payment transaction records to determine a subspace of an identified feature 400 within the embedding space (block 202). In one embodiment, this operation may be performed by the merchant recommendation system 25, and more particularly, the linear transform component 32 for instance.

Figure 5:
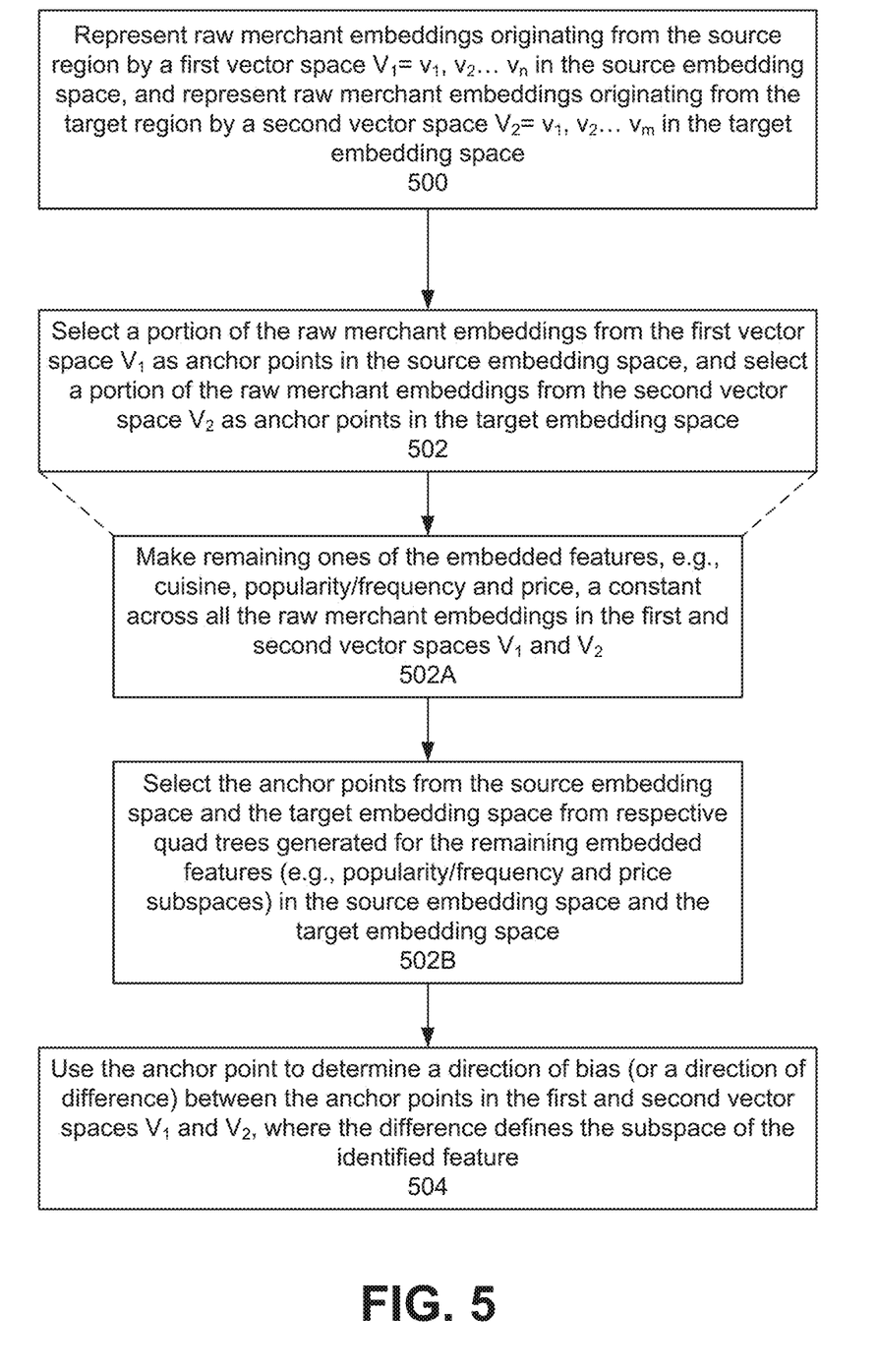
FIG. 5 illustrates a flow diagram of the process for determining a subspace of an identified feature within the embedding space.

FIG. 5 illustrates a flow diagram of the process for determining a subspace of an identified feature within the embedding space. Recall that the raw merchant embeddings 28 being operated on originate from both a source region associated with the target user, and a target region for which the merchant recommendations are made to the target user.

The process of determining the subspace of the identified feature 400 may include representing the raw merchant embeddings originating from the source region by a first vector space $V_1 = v_1, v_2 \ldots v_n$ in the source embedding space, and representing the raw merchant embeddings originating from the target region by a second vector space $V_2 = v_1, v_2 \ldots v_m$ in the target embedding space (block 500). For example, given a source and target cities, such as NY and San Francisco, two subsets $V_1$ and $V_2$ are created of restaurants belonging to NY and San Francisco, respectively (see FIG. 4B).

Next, the process selects a portion of the raw merchant embeddings from the first vector space $V_1$ as anchor points in the source embedding space, and selects a portion of the raw merchant embeddings from the second vector space $V_2$ as anchor points in the target embedding space (block 502).

However, the selection of raw merchant embeddings as anchor points in the first and second vector spaces $V_1$ and $V_2$ is problematic, as selecting random points yields a direction that is influenced by not just the location difference, but also the difference in frequency or cuisine type of the merchant restaurants selected. This gives a direction that is neither stable (and depends heavily on the random sample selected), nor accurate in capturing only the difference in location. A random direction does not actually capture the location direction between the source region and the target region.

According to a further aspect of the disclosed embodiments, the process of selecting the anchor points is refined by making remaining ones of the embedded features, e.g., cuisine, popularity/frequency and price, a constant across all the raw merchant embeddings in the first and second vector spaces $V_1$ and $V_2$ (block 502A). This alone, however, can lead to either selecting a set of raw merchant embeddings that are either too small to provide a reliable direction or merchant embeddings that were built from too few instances in the payment transaction records 24.

To alleviate this possibility, the process of making the remaining embedded features a constant further comprises selecting the anchor points from the source embedding space and the target embedding space from respective quadtrees generated for the remaining embedded features, e.g., popularity/frequency and price subspaces, in the source embedding space and the target embedding space (block 502B).

Popularity/frequency of a merchant denotes the number of times the merchant has been visited by users, which increases the merchant's frequency of occurrence in the file used by word embedding process 27 to generate the merchant embeddings 28. Since the word embedding process 27 encounters more instances of some merchants, the word embedding process 27 also updates the embeddings for these merchants more often, which makes the embedding of these merchants more resilient and stable. To find a cross-section of merchants that are visited in similar high frequencies and are of similar price range, the linear transform component 32 builds a quadtree on the popularity/frequency and price range in both the source embedding space and the target embedding space.

Figure 6A:
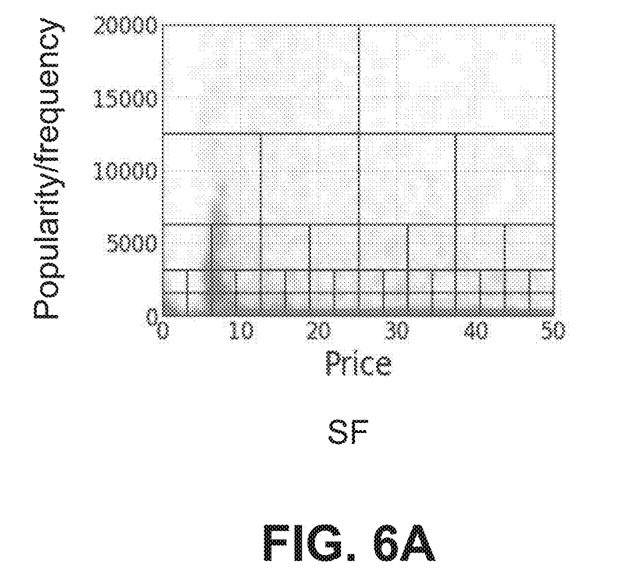
FIG. 6A illustrates a quadtree built for the example points for the merchants of SF in FIG. 4B.
Figure 6B:
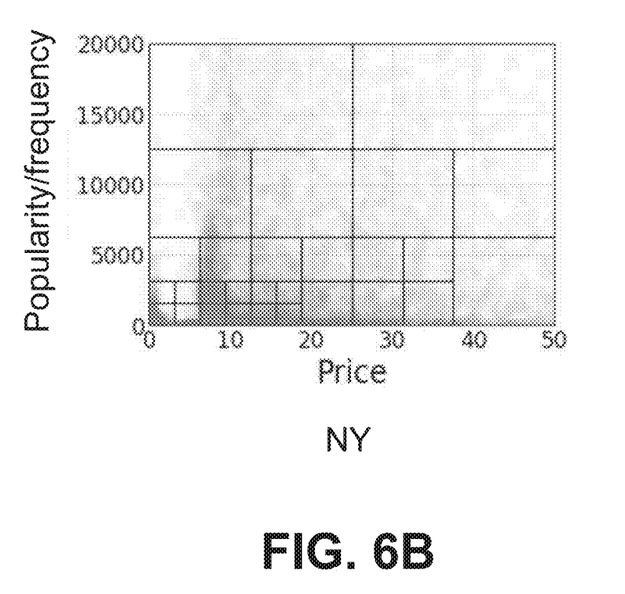
FIG. 6B illustrates a quadtree built for the example points for the merchants of NY in FIG. 4B.

FIG. 6A illustrates a quadtree built for the example points for the merchants of SF in FIG. 4B. FIG. 6B illustrates a quadtree built for the example points for the merchants of NY in FIG. 4B. A quadtree is a tree data structure in which each internal node has exactly four children. The linear transform component 32 divides the two dimensional space of popularity/frequency and price into cells in the respective quadtrees, where the cells in the quadtree for the source embedding space (e.g., SF) have approximately the same amount of vectors/merchant embeddings as the corresponding zones in the quadtree for the target embedding space (e.g., NY). For example, the linear transform component 32 populates the $6-$10 price zone in both cities with approximately the same number of merchants. This aids in finding spending patterns in between the two regions.

After the quadtrees are generated for the popularity/frequency and price subspaces, the quadtrees are used to select the anchor points from corresponding cells in both quadtrees that have a sufficient number of anchor points to provide a similar high number of transactions and to fix the popularity/frequency and price features in both regions.

Because it is desired that the cuisine of the merchants be expressed well in the merchant embeddings, it is vital not to lose any information about the cuisine contained in the merchant embeddings. One way to ensure this is to make sure that the merchants in the first and second vector spaces $V_1$ and $V_2$ have the same cuisine type. One problem however, is that the metadata about the merchants collected by the card payment processor 12 may not include restaurant cuisine information. According to a further aspect of the disclosed embodiments, to solve this, the merchant recommendation system 25 may select only those merchants that belong to the same chain and whose cuisine type remains constant across all its stores in the USA. Thus, chain restaurant names may be used as food category labels.

With popularity/frequency, price, and cuisine type fixed in both regions, the recommendation engine is able to make recommendations based on location, price range popularity or cuisine type. In addition, the source region of the user and the target region in which the recommendations are made may be the same region or different regions. That is, the target user may request a recommendation for merchants in her city of residence. And because, the linear projection component 32 does not need to be trained, the linear projection component 32 may operate on merchant embeddings from the source and target regions in real time.

Referring again to FIG. 5, after the remaining features, e.g., cuisine, popularity/frequency and price, are made constant across all the raw merchant embeddings in the first and second vector spaces $V_1$ and $V_2$, a direction of bias (b) or direction of difference is determined between the anchor points in the first and second vector spaces $V_1$ and $V_2$, where the direction of bias (b) or difference defines the subspace of the identified feature (block 504).

More specifically, the direction of bias (b) or the direction of difference is calculated according to a 2-means method by calculating average anchor points vectors for both the first and second vector spaces $V_1$ and $V_2$, divided by a distance between the average vectors:

$$b = \frac{\mathrm{mean}(v1) - \mathrm{mean}(v2)}{\|\mathrm{mean}(v1) - \mathrm{mean}(v2)\|}$$

Continuing with the example of two cities, NY and San Francisco, two subsets V1 and V2 are created of merchant restaurants belonging to NY and San Francisco, respectively. Applying 2-means between these two groups should roughly provide the direction between the two cities in the merchant embeddings. Thus, the direction of bias b, determines the subspace of the identified feature 400 to remove.

After the subspace of the identified feature 400 is determined, the linear transform component 32 uses the direction of bias to remove the subspace of the identified feature 400 from the embedding space to create modified merchant embeddings 306 that are merged and aligned with other ones of the plurality of features within the embedding space (block 204). In one embodiment, the modified merchant embeddings 306 are aligned in the target embedding space. In another embodiment, the modified merchant embeddings 306 are aligned in a new common embedding space.

In one embodiment, the identified subspace is removed by a linear projection step on the whole set of vectors/points in the first and second vector spaces $V_1$ and $V_2$ to bring all the vectors/points into a lower dimensional space uniformly, while preserving all information in the modified merchant embeddings apart from the specific subspace removed.

Descriptively, the linear projection improves any point in the embedding space by calculating the point's inner product with the direction of bias, and subtracting the result from that point. As is well known, an inner product is a generalization of a dot product, where in a vector space, the inner product is a way to multiply vectors together, with the result of this multiplication being a scalar. The inner product is an additional structure that associates each pair of vectors in the space with the scalar quantity known as the inner product of the vectors. The inner product enables the determination of the length of a vector, the angle between two vectors, or the orthogonality between vectors.

In one embodiment, the linear projection is determined for each of the anchor points by calculating:

$$v' = v - \langle v, b \rangle b, \text{ where } v = \text{anchor points from } V_1 \text{ or } V_2.$$

The process brings the directional difference between two points to zero, effectively removing a dimension. For example, if the merchant embeddings are in a 200 dimensional subspace, after the linear projection, there will be 199 dimensions due removal of the subspace.

In one embodiment, the identified feature 400 that is removed from the embedding space is location. The process of removing location, however, can also be applied to remove other features 304 in the embedding, however. Location is selected because the most common form of recommendation requires understanding users' spending patterns at one location, and predicting restaurants at a new city or location for those users. With location information removed from the merchant embeddings 28, the modified merchant embeddings 306 are aligned based on the other features 304 of the merchant embeddings in the embedding space.

Figure 7A:
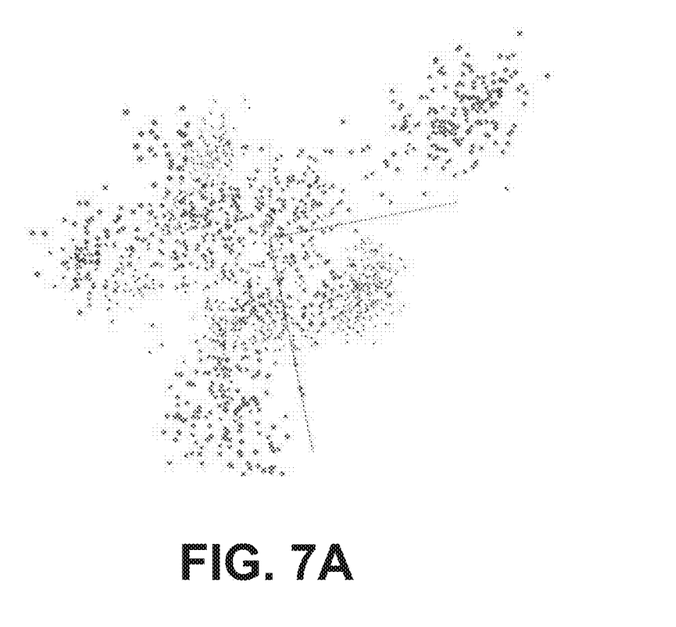
FIG. 7A is a diagram illustrating a PCA view of the merchant embeddings from San Francisco and NY from FIG. 4B after removal of location.
Figure 7B:
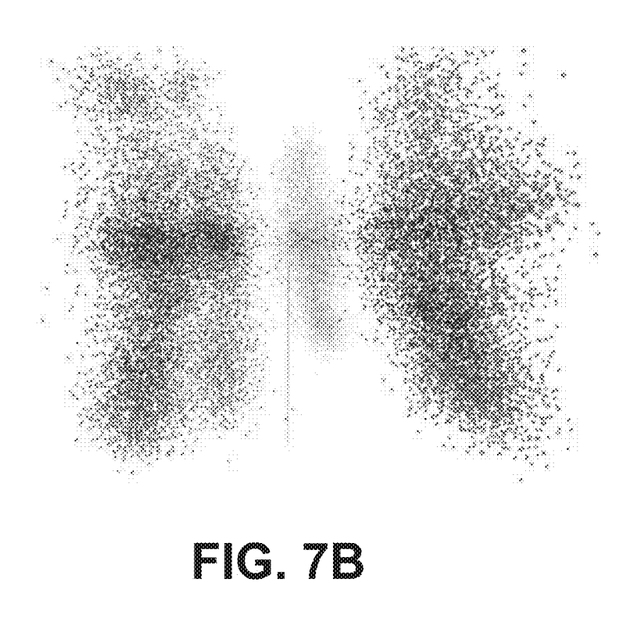
FIG. 7B is a diagram illustrating a PCA view of the merchant embeddings from California and Texas from FIG. 4C after removal of location.

FIG. 7A is a diagram illustrating a PCA view of the merchant embeddings from San Francisco and NY from FIG. 4B after removal of location. Similarly, FIG. 7B is a diagram illustrating a PCA view of the merchant embeddings from California and Texas from FIG. 4C after removal of location. The points of the two different regions from FIGS. 4B and 4C are now merged in the embedding space of FIGS. 7A and 7B, respectively, after the linear projection step using the 2-means method. In FIGS. 7A and 7B the classification boundary between the two regions is now more obscure than in FIGS. 4B and 4C. In FIG. 7B, the sub-clusters representing the remaining features of location, price and popularity/frequency are still visible.

Referring again to FIG. 2, after the modified merchant embeddings 306 have been generated to remove the identified feature, the merchant recommendation system 25 automatically generates a list of merchant rankings based on the modified merchant embeddings, past preferences of a target user based on the raw user embeddings, and the target region (block 206). As shown in FIG. 3, the preference model 34 uses the raw user embeddings 30 and the modified merchant embeddings 306 of merchants in proximity to the target region 310 to indicate to the recommendation engine 36 which ones of merchants might be preferable to the target user.

Finally, the recommendation engine 36 provides the list of merchant rankings to the target user (block 208). Ideally, the recommendation engine 36 effectively recommends merchants/restaurants that are similar to ones preferred by a user. In embodiments, the recommendation engine 36 may provide the list of merchant rankings to the target user by displaying the list in a web browser or software app on user device 42.

The process of automatically generating the list of merchant rankings includes several operations. The first operation includes generating, by the preference model 34, merchant preferences for the target user based on the modified merchant embeddings and the raw user embeddings 30. Given the target region, the recommendation engine 36 searches for local merchants located within proximity of the target region. The recommendation engine 36 then ranks these local merchants based on the merchant preference of the target user.

Feature subspace isolation and disentanglement using the linear transform component 32 can be expanded to other types of merchant recommendation systems other than restaurants. For example, for travel services, the merchant recommendation system 25 may be adapted to provide such travel agent recommendations, or for hotel service, the merchant recommendation system 25 may be adapted to provide hotel recommendations.

Referring again to FIG. 3, the preference model 34 executes in two stages: in an offline training stage 308A and in an online recommendation stage. During the training stage 308A, the machine learning preference model 34 is trained to learn different users' preferences over different restaurants. An intuition leveraged by the preference model 34 is that a user's preference over a restaurant is typically a relative ranking compared to another restaurant, instead of an absolute ranking. Based on this observation, the preference model 34 learns user preferences by comparing pairs of restaurants for each user. Specifically, data samples of two restaurants the target user has visited are extracted from all payment transaction records 24 within a learning time period. The user embeddings 30 and the modified merchant embeddings 306 of the two restaurants are concatenated and used as the input vector for the preference model 34. The preference model, which is a classifier, outputs a label of 1 or 0 to indicate whether the first restaurant or the second restaurant is more preferred (by comparing the frequencies that the user visited the two restaurants). Finally, given a current location of the user, the preference model 34 compares all pairs of restaurants within the location of the user and outputs a ranked list.

The disclosed embodiments provide an effective subspace isolation technique to remove a dominate feature, such as location, implicitly embedded in raw merchant embeddings 28 generated from payment transaction records 24. With location removed from the merchant embedding, merchants/restaurants are aligned on the other features of the embedding, such as cuisine style, for example. The merchant recommendations system is thus operable to recommend similar merchants/restaurants for cardholders in a target region as in their source region.

The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A computer-implemented method for making merchant recommendations for a target user, comprising:
   receiving, by one or more processors, raw merchant embeddings generated from payment transaction records without any rating data, review data, or browsing session data, wherein the raw merchant embeddings represent merchants in different locations and include a plurality of embedded features, including a location feature and a price feature that are entangled in an embedding space such that the location feature causes the raw merchant embeddings for the merchants in different locations to be separated in the embedding space, the raw merchant embeddings originating from both a source region most frequented by the target user, and a target region for which merchant recommendations are made for the target user;
   using, by the one or more processors, transaction metadata associated with the payment transaction records to determine a subspace of the location feature within the embedding space by:
   representing the raw merchant embeddings originating from the source region by a first vector space $V_1 = v_1, v_2 \ldots v_n$ in a source embedding space, and representing the raw merchant embeddings originating from the target region by a second vector space $V_2 = v_1, v_2 \ldots v_m$ in a target embedding space;
   selecting a portion of the raw merchant embeddings from the first vector space $V_1$ as anchor points in the source embedding space, and selecting a portion of the raw merchant embeddings from the second vector space $V_2$ as anchor points in the target embedding space; and
   determining a direction of bias (b) between the anchor points in the first vector space $V_1$ and the second vector space $V_2$, wherein the direction of bias (b) defines the subspace of the location feature;
   removing, by the one or more processors, the subspace of the location feature from the embedding space using a linear transformation process to create modified merchant embeddings in which remaining embedded features, including the price feature, a popularity/frequency feature, and a cuisine type feature, are merged and aligned within the embedding space so that the modified merchant embeddings representing the merchants in the different locations occupy a similar region of the embedding space;
   generating, by the one or more processors, a list of merchant rankings based on the modified merchant embeddings, past preferences of the target user determined using raw user embeddings, and the target region; and
   providing, by the one or more processors, the list of merchant rankings to the target user.

2. The method of claim 1, wherein selecting the anchor points further comprises:
   making remaining features of the plurality of embedded features a constant across all the raw merchant embeddings in the first vector space $V_1$ and the second vector space $V_2$.

3. The method of claim 2, wherein making remaining features of the plurality of embedded features a constant further comprises:
   selecting the anchor points from the source embedding space and the target embedding space from a first quadtree generated for the remaining features of the plurality of embedded features in the source embedding space and a second quadtree generated for the remaining features of the plurality of embedded features in the target embedding space.

4. The method of claim 3, further comprising: selecting the anchor points from corresponding cells in the first quadtree and the second quadtree.

5. The method of claim 1, wherein determining the direction of bias (b) further comprises calculating:

$$b = \frac{\text{mean}(v1) - \text{mean}(v2)}{\|\text{mean}(v1) - \text{mean}(v2)\|}.$$

6. The method of claim 1, wherein removing the subspace of the location feature from the embedding space further comprises:
   determining a linear projection for each of the anchor points using a direction by calculating:

$v = v - <v,b>b$, where $v$=anchor points from $V_1$ or $V_2$.

7. The method of claim 1, further comprising: generating the raw merchant embeddings from the payment transaction records by a word embedding process.

8. A system for making merchant recommendations for a target user, comprising:
   a transaction database storing payment transaction records;
   a hardware processor having access to the transaction database; and
   a software component containing program instructions, which when executed by the hardware processor cause the hardware processor to:
   receive raw merchant embeddings generated from the payment transaction records without any rating data, review data, or browsing session data, wherein the raw merchant embeddings represent merchants in different locations and include a plurality of embedded features, including a location feature and a price feature that are entangled in an embedding space such that the location feature causes the raw merchant embeddings for the merchants in different locations to be separated in the embedding space, the raw merchant embeddings originating from both a source region most frequented by the target user, and a target region for which merchant recommendations are made for the target user;
   use transaction metadata associated with the payment transaction records to determine a subspace of the location feature within the embedding space by:
   representing the raw merchant embeddings originating from the source region by a first vector space $V_1 = v_1, v_2 \ldots v_n$ in a source embedding space, and representing the raw merchant embeddings originating from the target region by a second vector space $V_2 = V_1, v_2 \ldots v_m$ in a target embedding space;
   selecting a portion of the raw merchant embeddings from the first vector space $V_1$ as anchor points in the source embedding space, and selecting a portion of the raw merchant embeddings from the second vector space $V_2$ as anchor points in the target embedding space; and
   determining a direction of bias (b) between the anchor points in the first vector space $V_1$ and the second vector space $V_2$, wherein the direction of bias (b) defines the subspace of the location feature;
   remove the subspace of the location feature from the embedding space using a linear transformation process to create modified merchant embeddings in which remaining embedded features, including the price feature, a popularity/frequency feature, and a cuisine type feature, are merged and aligned within the embedding space so that the modified merchant embeddings representing the merchants in the different locations occupy a similar region of the embedding space;
   generate a list of merchant rankings based on the modified merchant embeddings, past preferences of the target user determined using raw user embeddings, and the target region; and
   provide the list of merchant rankings to the target user.

9. The system of claim 8, wherein selecting the anchor points further comprises:
   making remaining features of the plurality of embedded features a constant across all the raw merchant embeddings in the first vector space $V_1$ and the second vector space $V_2$.

10. The system of claim 9, wherein making remaining features of the plurality of embedded features a constant further comprises:
    selecting the anchor points from the source embedding space and the target embedding space from a first quadtree generated for the remaining features of the plurality of embedded features in the source embedding space and a second quadtree generated for the remaining features of the plurality of embedded features in the target embedding space.

11. The system of claim 10, further comprising: selecting the anchor points from corresponding cells in the first quadtree and the second quadtree.

12. The system of claim 8, wherein determining the direction of bias (b) further comprises calculating:

$$b = \frac{\text{mean}(v1) - \text{mean}(v2)}{\|\text{mean}(v1) - \text{mean}(v2)\|}.$$

13. The system of claim 8, wherein removing the subspace of the location feature from the embedding space further comprises:
    determining a linear projection for each of the anchor points using a direction by calculating:

$v = v - <v,b>b$, where $v$=anchor points from $V_1$ or $V_2$.

14. The system of claim 8, further comprising: generating the raw merchant embeddings from the payment transaction records by a word embedding process.

15. A non-transitory computer-readable medium containing program instructions for making merchant recommendations for a target user, the instructions comprising:
    receiving, by one or more processors, raw merchant embeddings generated from payment transaction records without any rating or review data or browsing session data, wherein the raw merchant embeddings originate from a source region most frequented by the target user, and a target region for which merchant recommendations are made for the target user, and wherein the raw merchant embeddings represent merchants in different locations and include a plurality of embedded features entangled in an embedding space, the embedded features including a location feature, a price feature and a cuisine type feature, such that the location feature causes the raw merchant embeddings for the merchants in different locations to be separated in the embedding space;
    using, by the one or more processors, transaction metadata associated with the payment transaction records to determine a subspace of the location feature within the embedding space by:
    determining a direction of bias (b) between anchor points in a first vector space $V_1 = v_1, v_2 \ldots v_n$ representing the raw merchant embeddings originating from the source region and anchor points in a second vector space $V_2 = v_1, v_2 \ldots v_m$ representing the raw merchant embeddings originating from the target region, wherein the direction of bias (b) defines the subspace of the location feature and is calculated as:

$$b = \frac{\text{mean}(v1) - \text{mean}(v2)}{\|\text{mean}(v1) - \text{mean}(v2)\|};$$

removing, by the one or more processors, the subspace of the location feature from the embedding space using a linear transformation process to create modified merchant embeddings in which remaining embedded features are merged and aligned within the embedding space by calculating v'=v−<v, b>b, where v=anchor points from $V_1$ or $V_2$, so that the modified merchant embeddings representing the merchants in the different locations occupy a similar region of the embedding space;

generating, by the one or more processors, a list of merchant rankings based on the modified merchant embeddings, past preferences of the target user determined using raw user embeddings, and the target region; and providing, by the one or more processors, the list of merchant rankings to the target user.

* * * * *